(12) United States Patent
Sasaki et al.

(10) Patent No.: US 12,337,482 B2
(45) Date of Patent: Jun. 24, 2025

(54) PATH GENERATION DEVICE AND METHOD

(71) Applicant: OMRON Corporation, Kyoto (JP)

(72) Inventors: Hiromi Sasaki, Kyoto (JP); Yuki Tsuchihashi, Kyoto (JP); Masahiro Murai, Kyoto (JP)

(73) Assignee: OMRON Corporation, Kyoto (JP)

( * ) Notice: Subject to any disclaimer, the term of this patent is extended or adjusted under 35 U.S.C. 154(b) by 191 days.

(21) Appl. No.: 18/109,480

(22) Filed: Feb. 14, 2023

(65) Prior Publication Data

US 2023/0286151 A1      Sep. 14, 2023

(30) Foreign Application Priority Data

Mar. 14, 2022   (JP) .................. 2022-039718

(51) Int. Cl.
   *B25J 9/16*   (2006.01)
(52) U.S. Cl.
   CPC ............. *B25J 9/1664* (2013.01); *B25J 9/163* (2013.01); *B25J 9/1653* (2013.01)
(58) Field of Classification Search
   CPC ........ B25J 9/1664; B25J 9/163; B25J 9/1653; G05B 2219/36504; G05B 19/401; G05B 2219/36321; G05B 19/425; H04W 24/06; H04W 8/14; H04W 24/08
   See application file for complete search history.

(56) References Cited

U.S. PATENT DOCUMENTS

| | | | |
|---|---|---|---|
| 2004/0172168 A1 | 9/2004 | Watanabe et al. | |
| 2010/0138030 A1* | 6/2010 | Kohlmaier | B25J 9/1684 700/192 |
| 2011/0276307 A1 | 11/2011 | Taguchi et al. | |
| 2013/0346348 A1* | 12/2013 | Buehler | G05B 19/423 901/31 |
| 2015/0258684 A1 | 9/2015 | Harada et al. | |
| 2018/0210434 A1* | 7/2018 | Iwatake | G05B 19/423 |

FOREIGN PATENT DOCUMENTS

JP        6364836 B2      8/2018

OTHER PUBLICATIONS

Partial European Search Report issued in European Patent Application No. 23156672.0 dated Aug. 8, 2023.

* cited by examiner

*Primary Examiner* — Sohana Tanju Khayer
*Assistant Examiner* — Dylan M Katz
(74) *Attorney, Agent, or Firm* — Morgan, Lewis & Bockius LLP

(57) ABSTRACT

A reception section 102 receives a classification of a shape of a target object for a case in which a robot is to perform an action along the target object. An instruction section 104 instructs a user with a number of training points identified for each classification of the shape as training points for training positions of a specific location of the robot to perform the action. An acquisition section 106 acquires positional information of the specific location of the robot as trained by manipulation by the user according to the instruction. A estimation section 108 estimates a shape of the target object based on the acquired positional information. A generation section 110 generates a path for the robot to perform the action along the target object based on the estimated shape of the target object.

20 Claims, 13 Drawing Sheets

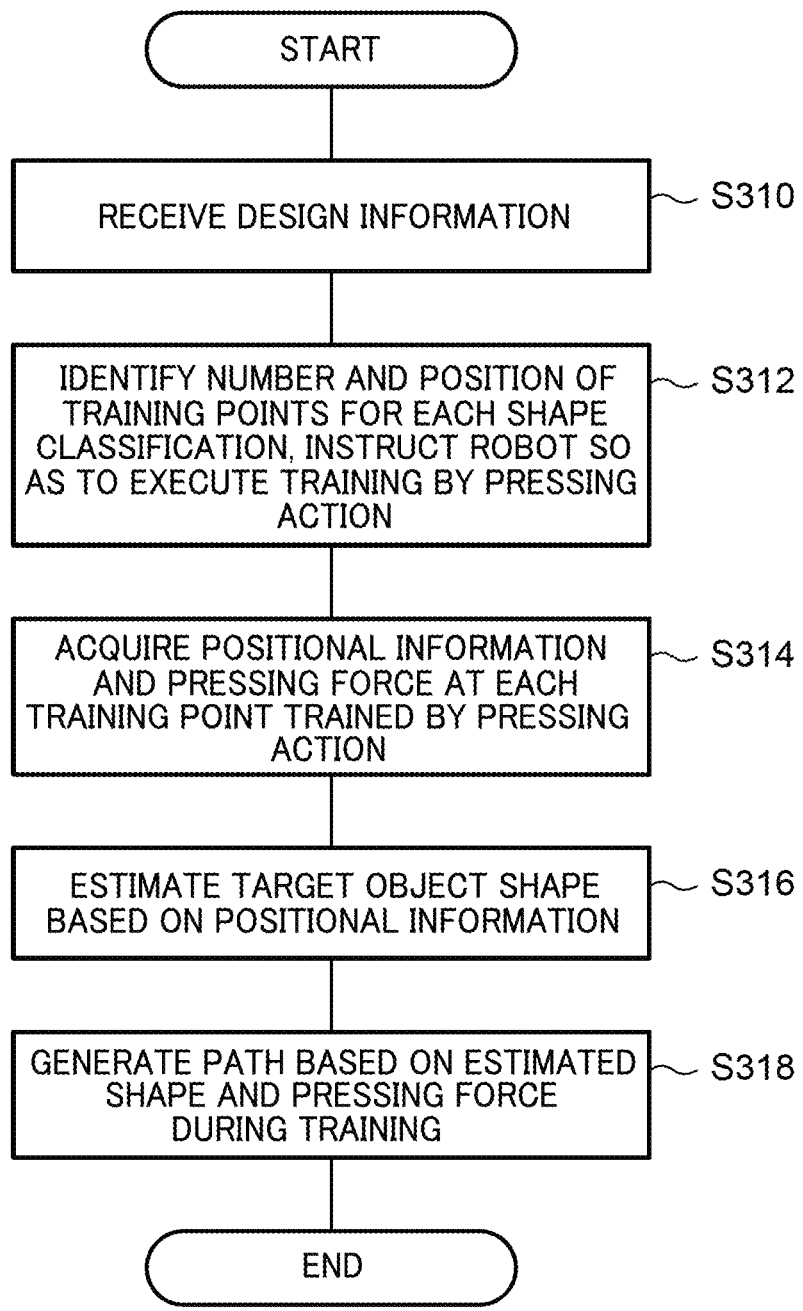

PATH GENERATION DEVICE AND METHOD

CROSS-REFERENCE TO RELATED APPLICATION

This application is based on and claims the benefit of priority of the prior Japanese Patent Application No. 2022-039718, filed on Mar. 14, 2022, the entire contents of which are incorporated herein by reference.

BACKGROUND

Technical Field

The present disclosure relates to a path generation device and a path generation method.

Background Art

Hitherto, generating an action path of a robot has been performed by training a position of a robot at plural locations along the path to be generated. In cases in which the action of the robot is an action along a target object, there is a need for exact training along the shape of the target object due to the need to generate the path along the shape of the target object. For example, in cases in which a sheet-shaped object such as a sticker is to be stuck onto a target object by a robot equipped with a roller serving as an end effector, the robot performs a sticking action so as to run along a surface of the target object with the roller. When in such cases training accuracy is low and the robot action is along a path generated based on positional information of such training points, then this gives rise to the possibility that the load of the roller on the target object becomes excessively larger, and that deformation, damage, or the like occurs to the target object. Moreover, there is also the possibility of a gap being left between the roller and the target object, and of poor sticking occurring, such as creases in the sticker or the like, or bubbles being generated.

As technology related to robots that perform operations on soft objects, such as a sheet-shaped body or the like, there is, for example, a proposal for a robot including a hand that grips the soft object, a control section that actuates the hand, and an imaging section that successively captures images containing the soft object. In such a robot, the control section computes an approximation equation to represent a surface shape of the soft object based on the successively captured images, and then, based on the computed approximation equation, computes a position and orientation of a specific portion of the soft object, successively converts a speed of the specific portion of the soft object into a speed of the hand based on the position and orientation of the specific portion of the soft object, and employs the converted hand speed to actuate the hand (see Japanese Patent No. 6364836).

SUMMARY OF INVENTION

Technical Problem

Generally an action path for a robot is generated by straight-line interpolation of positional information for training points. In such cases many training points are needed in order to generate a path along a shape of a target object with good accuracy. In particular in cases in which the shape of the target object is a curved surface, even more training points are needed so as to get a path generated by straight-line interpolation to approximate to such a curved surface.

However, the training workload increases when there are many training points. Namely, there is a tradeoff between raising the training accuracy and reducing the training workload. There are also cases in which direct training is difficult, such as at corners of the target object, and at connection points between one shape and another shape.

In consideration of the above circumstances, an object of the present disclosure is to achieve both a reduction in training points for path generation along a shape of a target object and an increase in training accuracy.

Solution to Problem

In order to address the above object, a path generation device according to a first aspect is configured including a reception section, an instruction section, an acquisition section, a estimation section, and a generation section. The reception section receives a classification of a shape of a target object for a case in which a robot is to perform an action along the target object. The instruction section instructs, based on the classification of the shape received by the reception section, a user with a number of training points identified for each classification of the shape as training points for training positions of a specific location of the robot to perform the action. The acquisition section acquires positional information of the specific location of the robot as trained by manipulation by the user according to the instruction by the instruction section. The estimation section estimates a shape of the target object based on the positional information acquired by the acquisition section. The generation section generates a path for the robot to perform the action along the target object based on the shape of the target object as estimated by the estimation section. This thereby enables both a reduction in training points for generating a path along a shape of a target object and an increase in training accuracy to be achieved.

The reception section may receive classifications of a string of shapes of the target object in a sequence in which the shapes are opposed by the specific location of the robot in the action, and the estimation section may estimate a first shape as a estimation target in the string of shapes based on a second shape estimated one previous to the first shape and on the acquired positional information. This thereby enables the number of training points to be reduced.

Moreover, based on the classification of the shape received by the reception section, the instruction section may instruct a minimum number of the training points capable of uniquely determining the shape and a next shape in the string of shapes. This thereby enables the number of training points to be reduced.

Moreover, in cases in which the estimated first shape and the estimated second shape are both flat surfaces, the estimation section may estimate a line of intersection between the first shape and the second shape as a corner of the target object, and in cases in which one out of the first shape and the second shape is a flat surface and the other is a curved surface, the estimation section may estimate a tangent line tangential to the first shape and the second shape as connection points of the target object. This thereby enables corners and connection points that are difficult to train directly to be more exactly identified by estimation.

Moreover, the acquisition section may further acquire positional information of a training point added by the user in addition to the instruction by the instruction section, and the estimation section may estimate the shape based on the positional information of the training points corresponding to the instruction by the instruction section and the positional information of the training point added by the user. This thereby enables more accurate estimation of the target object shape.

Moreover, the estimation section may estimate a shape so as to minimize error in the positional information respectively acquired. This thereby enables more accurate estimation of the target object shape.

Moreover, in cases in which there is positional information present having a large error to the estimated shape, the estimation section may execute at least one out of processing to warn of the presence of the positional information having a large error, or processing to remove the positional information having a large error and re-estimate the shape. This thereby enables recognition of the presence, or removal, of positional information for training points for which appropriate training has not been performed.

A path generation device according to a second aspect is configured including a reception section, an instruction section, an acquisition section, a estimation section, and a generation section. The reception section receives a design position and a design shape of a target object for a case in which a robot is to perform an action along the target object. The instruction section identifies, based on the design position and the design shape of the target object received by the reception section, a number and position of training points as identified for each classification of shape of the target object as training points for training positions of a specific location of the robot to perform the action, and instructs the robot such that the robot presses against the target object and training is executed at the identified training points. The acquisition section acquires positional information of the specific location of the robot as trained according to the instruction by the instruction section and acquires an external force acting on the robot. The estimation section estimates a shape of the target object based on the positional information acquired by the acquisition section. The generation section generates a path for the robot to perform the action along the target object based on the shape of the target object as estimated by the estimation section and on the external force acquired by the acquisition section. This thereby enables both a reduction in training points for generating a path along a shape of a target object and an increase in training accuracy to be achieved.

A path generation method according to a third aspect is a method including: a reception section receiving a classification of a shape of a target object for a case in which a robot is to perform an action along the target object; an instruction section instructing a user, based on the classification of the shape received by the reception section, with a number of training points identified for each classification of the shape as training points for training positions of a specific location of the robot to perform the action; an acquisition section acquiring positional information of the specific location of the robot as trained by manipulation by the user according to the instruction by the instruction section; a estimation section estimating a shape of the target object based on the positional information acquired by the acquisition section; and a generation section generating a path for the robot to perform the action along the target object based on the shape of the target object as estimated by the estimation section.

A path generation method according to a fourth aspect is a method including: a reception section receiving a design position and a design shape of a target object for a case in which a robot is to perform an action along the target object; an instruction section identifying, based on the design position and the design shape of the target object received by the reception section, a number and position of training points as identified for each classification of shape of the target object as training points for training positions of a specific location of the robot to perform the action, and instructing the robot such that the robot presses against the target object and training is executed at the identified training points; an acquisition section acquiring positional information of the specific location of the robot as trained according to the instruction by the instruction section and acquires an external force acting on the robot; a estimation section estimating a shape of the target object based on the positional information acquired by the acquisition section; and a generation section generating a path for the robot to perform the action along the target object based on the shape of the target object as estimated by the estimation section and on the external force acquired by the acquisition section.

A path generation program according to a fifth aspect is a program that causes a computer to function as: a reception section that receives a classification of a shape of a target object for a case in which a robot is to perform an action along the target object; an instruction section that, based on the classification of the shape received by the reception section, instructs a user with a number of training points identified for each classification of the shape as training points for training positions of a specific location of the robot to perform the action; an acquisition section that acquires positional information of the specific location of the robot as trained by manipulation by the user according to the instruction by the instruction section; a estimation section that estimates a shape of the target object based on the positional information acquired by the acquisition section; and a generation section that, based on the shape of the target object as estimated by the estimation section, generates a path for the robot to perform the action along the target object.

A path generation program according to a sixth aspect is a program that causes a computer to function as: a reception section that receives a design position and a design shape of a target object for a case in which a robot is to perform an action along the target object; an instruction section that, based on the design position and the design shape of the target object received by the reception section, identifies a number and position of training points as identified for each classification of shape of the target object as training points for training positions of a specific location of the robot to perform the action, and instructs the robot such that the robot presses against the target object and training is executed at the identified training points; an acquisition section that acquires positional information of the specific location of the robot as trained according to the instruction by the instruction section and acquires an external force acting on the robot; a estimation section that estimates a shape of the target object based on the positional information acquired by the acquisition section; and a generation section that, based on the shape of the target object as estimated by the estimation section and on the external force acquired by the acquisition section, generates a path for the robot to perform the action along the target object.

The path generation device, method, and program according to the present disclosure enable both a reduction in training points for generating a path along a shape of a target object and an increase in training accuracy to be achieved.

BRIEF DESCRIPTION OF DRAWINGS

FIG. 15 is a flowchart illustrating a flow of path generation processing in the third exemplary embodiment.

DESCRIPTION OF EMBODIMENTS

Figure 1:
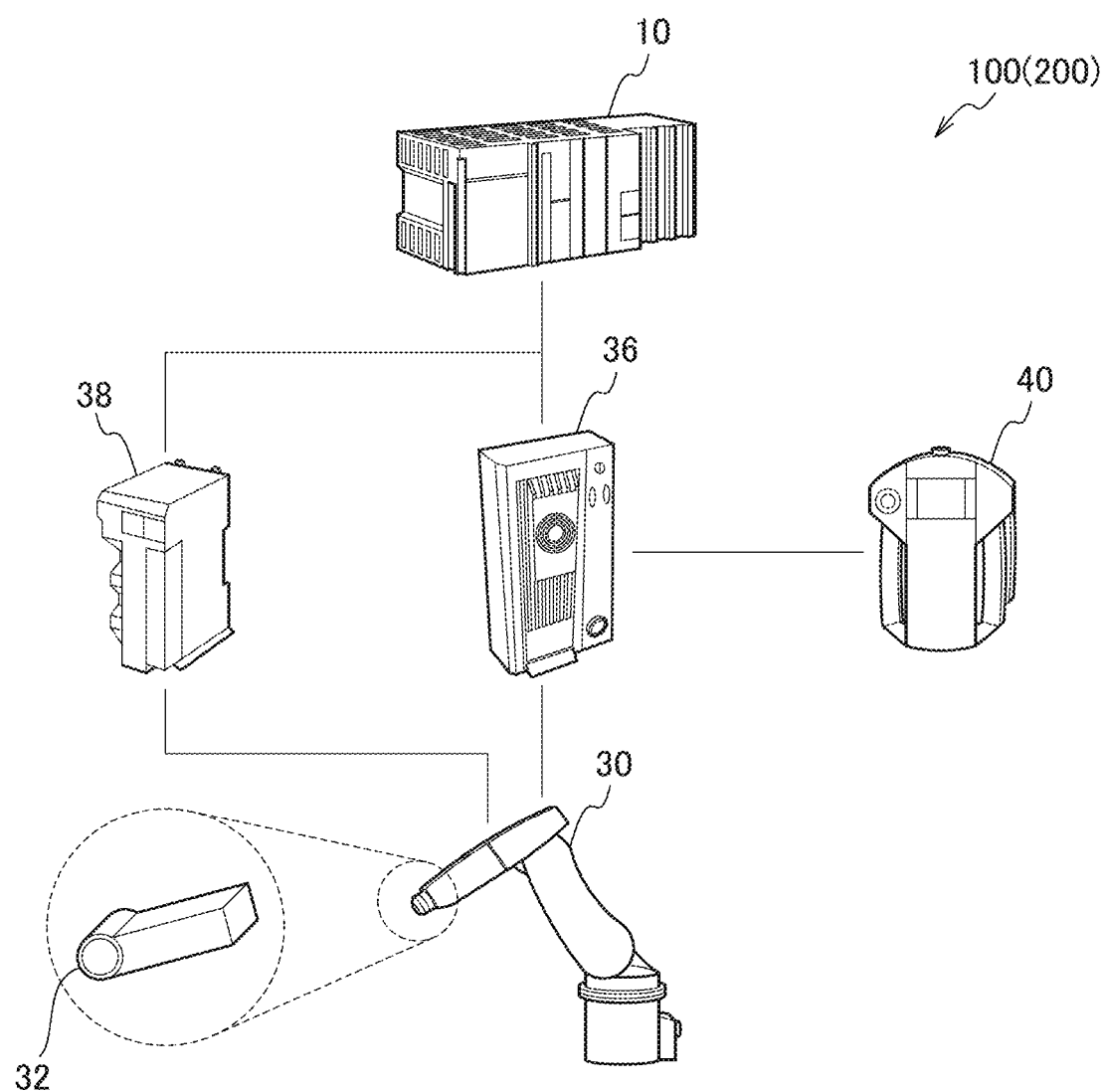
FIG. 1 is a schematic diagram illustrating a configuration of a robot control system according to a first and a second exemplary embodiment.

Description follows regarding an example of exemplary embodiments of the present disclosure, with reference to the drawings. Note that the same or equivalent configuration elements and parts are appended with the same reference numerals in the drawings. The dimensions and proportions in the drawing are sometimes exaggerated for ease of explanation and differ from actual proportions.

First Exemplary Embodiment

As illustrated in FIG. 1, a robot control system 100 according to a first exemplary embodiment is configured including a path generation device 10, a robot 30, a roller 32, a robot control device 36, an input/output (I/O) device 38, and a training pendant 40.

The robot 30 is, for example, an upright articulated robot equipped with a configuration having six degrees of freedom needed for actions in three dimensional space. Note that the degrees of freedom of the robot 30 may be include a seventh degree of freedom by adding a redundant degree of freedom to the six degrees of freedom. The robot 30 acts under control from the robot control device 36 according to path information output from the path generation device 10, or according to manipulation by the training pendant 40.

The roller 32 is an example of an end effector attached to a distal end of an arm of the robot 30. In the present exemplary embodiment a description will be given of a case in which the roller 32 is applied as an example of an end effector to explain cases in which the robot 30 is caused to perform a sticking action to stick a sheet-shaped object such as a sticker to a target object (workpiece), however an end effector is not restricted to being the roller 32, and any end effector compatible with the task to be executed by the robot 30 may be applied.

The robot control device 36 generates action command values to actuate the robot 30 based on the path information output from the path generation device 10 or on manipulation by the training pendant 40, and outputs these values to the robot 30.

The I/O device 38 acquires a rotation angle for each joint from the robot 30, and outputs these rotation angles to the path generation device 10. The training pendant 40 is an instrument employed to train the robot 30, and is an instrument to perform remote control of the robot 30.

The path generation device 10 generates a path of the robot 30 to cause the robot 30 to execute an action corresponding to a task. In the present exemplary embodiment the path generation device 10 generates a path for the robot 30 to execute an action along a target object, and more specifically a sticking action to stick a sheet-shaped object to the target object. Note that an example of such a path is a time series of end effector positions when a specific location of the roller 32 attached to a finger of the robot 30 is moved from a given start point to a given end point. In the present exemplary embodiment the specific location referred to above is a position of a shaft of the roller. An orientation of the robot 30 is expressed in a series of values (rotation angles) for each joint $(\theta_{J1}, \theta_{J2}, \ldots, \theta_{JN})$ from a first joint (joint J1) of the robot 30 to an $N^{th}$ joint thereof (joint JN wherein N is the number of joints of the robot) for a case in which the shaft of the roller 32 of the finger of the robot 30 is assumed to be at a given position (x, y, z) and orientation (roll, pitch, yaw).

Figure 2:
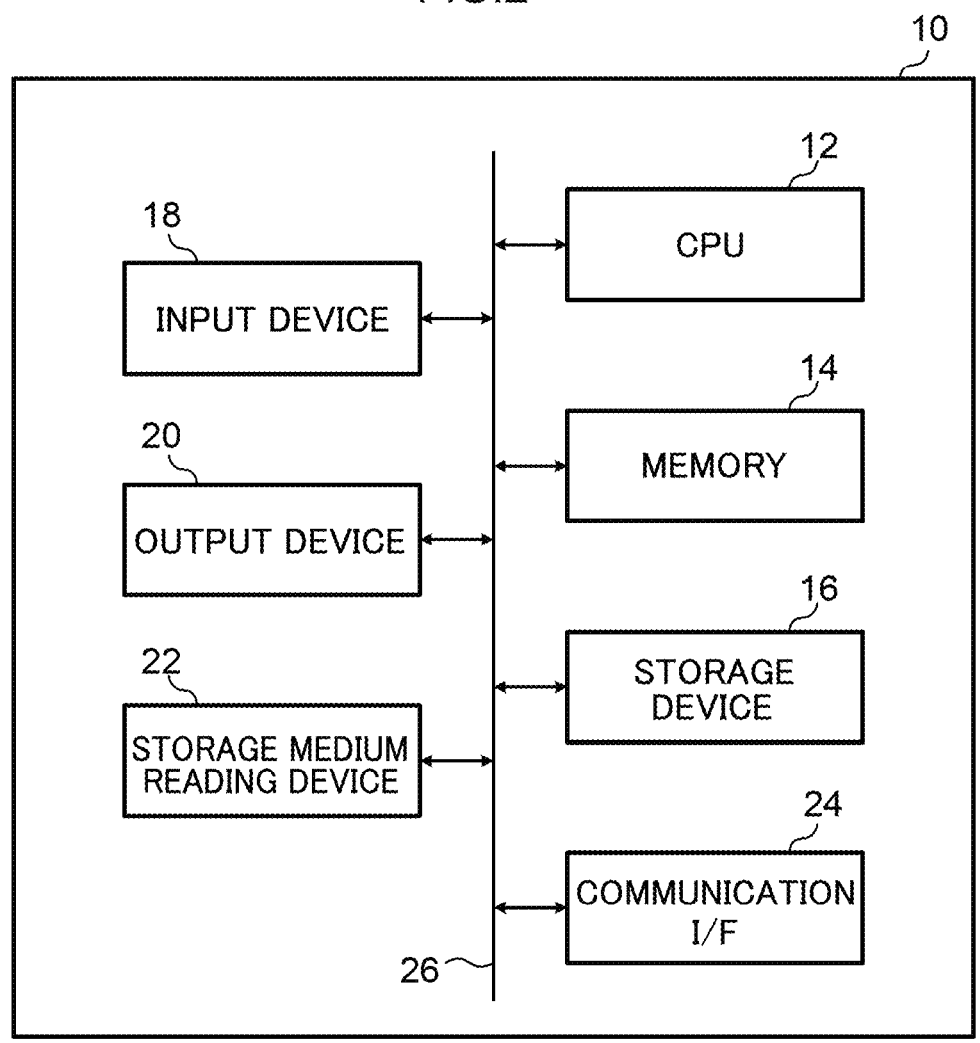
FIG. 2 is a block diagram illustrating a hardware configuration of a path generation device.

FIG. 2 is a block diagram illustrating a hardware configuration of the path generation device 10 according to the present exemplary embodiment. As illustrated in FIG. 2, the path generation device 10 includes a central processing unit (CPU) 12, memory 14, a storage device 16, an input device 18, an output device 20, a storage medium reading device 22, and a communication interface (I/F) 24. These configuration sections are connected together through a bus 26 so as to be capable of communicating with each other.

A path generation program for executing path generation processing is stored in the storage device 16. The CPU 12 is a central processing unit that executes various programs and controls each section. Namely, the CPU 12 reads a program from the storage device 16 and executes the program using the memory 14 as a workspace. The CPU 12 controls the above configuration sections and performs various computation processing according to the program stored on the storage device 16.

The memory 14 is configured by random access memory (RAM), and is employed as a workspace to temporarily store programs and data. The storage device 16 is configured by read only memory (ROM), and a hard disk drive (HDD), a solid state drive (SSD), or the like, and various programs including an operating system and various data are stored thereon.

The input device 18 is a device for performing various inputs and is, for example, a keyboard, a mouse, or the like. The output device 20 is a device for outputting various information and is, for example, a display, a printer, or the like. The output device 20 may also function as the input device 18 by utilizing a touch panel display therefor.

The storage medium reading device 22 performs reading of data stored on various storage mediums, such as compact disk (CD)-ROM, digital versatile disc (DVD)-ROM, Blu-ray disc, universal serial bus (USB) memory, or the like, and performs writing of data to these storage mediums. The communication I/F 24 is an interface for communication with other devices, and employs a standard such as, for example, Ethernet (registered trademark), FDDI, Wi-Fi (registered trademark).

Figure 3:
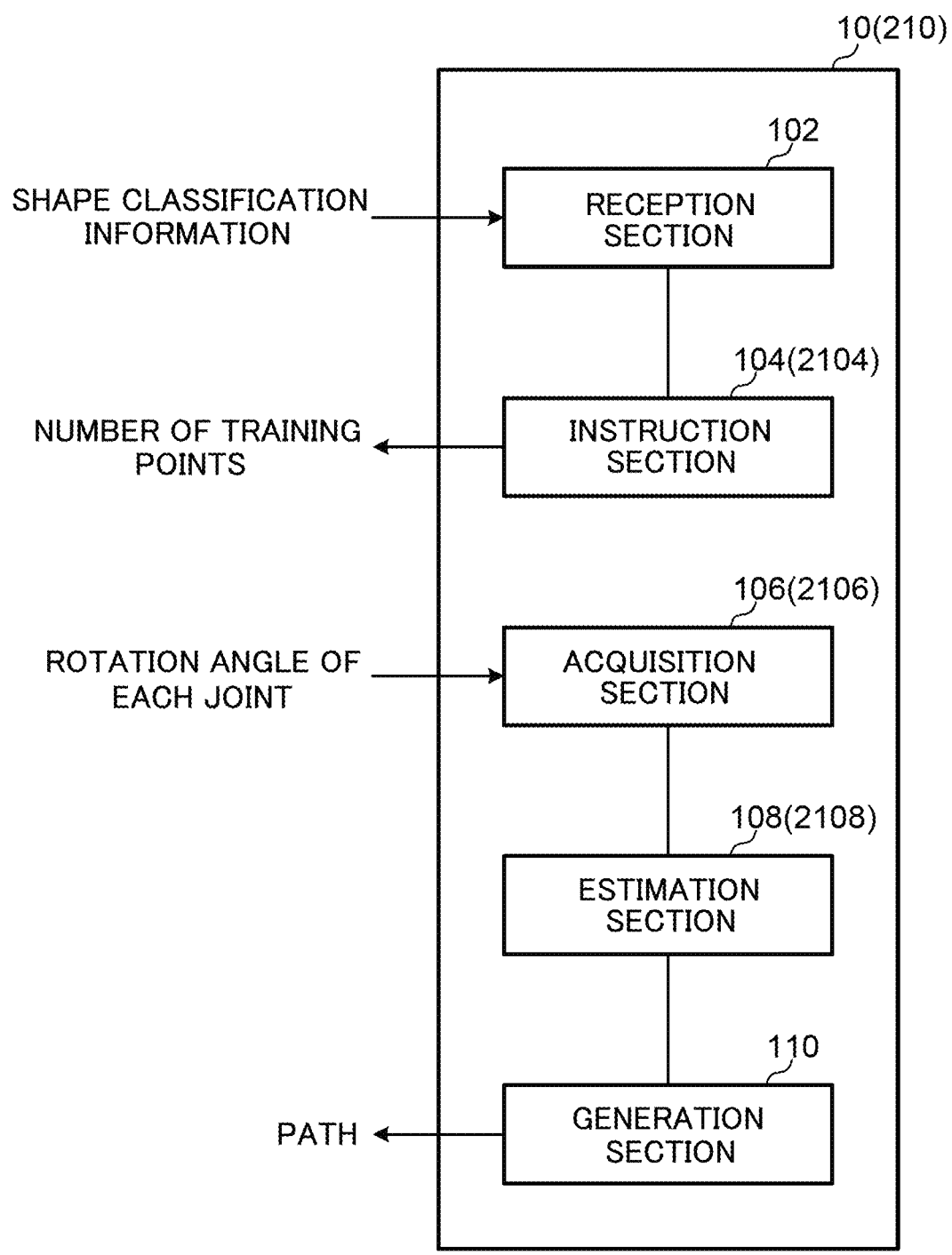
FIG. 3 is a block diagram illustrating an example of a functional configuration of a path generation device according to the first and second exemplary embodiments.

Next, description follows regarding a functional configuration of the path generation device 10 according to the first exemplary embodiment. FIG. 3 is a block diagram illustrating an example of a functional configuration of the path generation device 10. As illustrated in FIG. 3, the path generation device 10 includes, as functional configuration, a reception section 102, an instruction section 104, an acquisition section 106, a estimation section 108, and a generation section 110. Each of the functional configuration sections is implemented by the CPU 12 reading the path generation program stored on the storage device 16, expanding the program in the memory 14, and executing the program.

Figure 4:
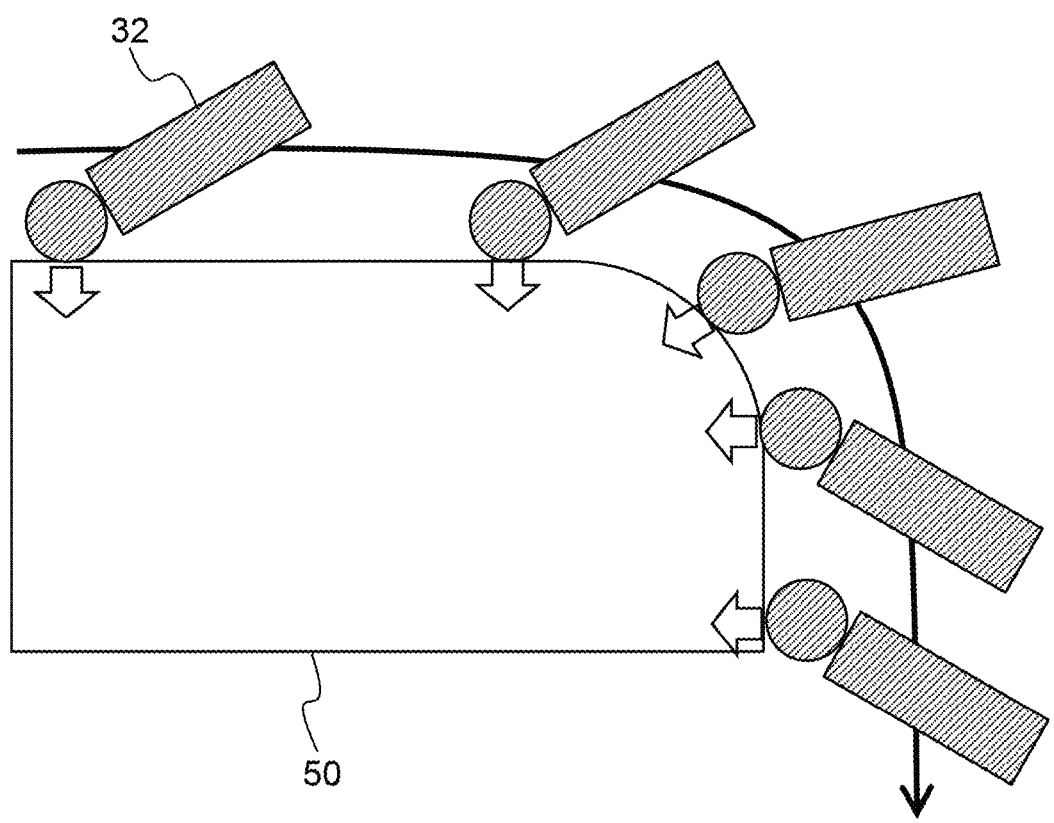
FIG. 4 is a schematic side view of a target object and a roller portion.

Explanation follows regarding a sticking action of sticking something to a target in the present exemplary embodiment. FIG. 4 schematically illustrates a target object 50 and a roller 32 portion in side view. The sticking action is an action to stick a sheet such as a sticker uniformly to the target object 50 by moving the roller 32 so as to run along the surface of the target object 50 while pressing the roller 32 sequentially against the sheet from an edge thereof, thereby achieving close contact between an adhesive face of the sticker and the surface of the target object 50. In FIG. 4 the solid line arrow illustrates a movement direction of the roller 32, and the wide block arrows illustrate pressing directions of the roller 32. Detailed description follows regarding each functional configuration for path generation to implement this sticking action.

The reception section 102 receives shape classification information indicating a shape classification of the target object 50 for cases in which the robot 30 is performing an action along the target object 50. The shape classification information may be input by a user, and may be the input of information extracted from design information and the like of the target object 50. More specifically, in an action string, the reception section 102 receives the shape classification information as a series of shape classifications for a string of shapes of the target object 50 in a sequence of the shapes as they are opposed by the roller 32 attached to the distal end of the robot 30. The shape classification includes, for example, flat surface, rounded surface, elliptical surface, and a B-spline curve surface. For example, in the example of FIG. 4, the reception section 102 receives shape classification information such as "flat surface—rounded surface—flat surface". The reception section 102 may also receive shape classification information that includes a shape of a coupling portion between shapes such as "flat surface—connection point—rounded surface—connection point—flat surface" and "flat surface—corner—flat surface".

Based on the shape classification information received by the reception section 102, the instruction section 104 identifies a number of training points identified for each of the shape classifications as training points for training the position of the shaft of the roller 32 at the distal end of the robot 30 for performing the action string. The number of training points may be predetermined based on an adjacent shape in the string of shapes and on the shape classification of the target shape, and may be a number of training points computed as being needed to uniquely determine the shape of the target. The instruction section 104 also identifies a start point and an end point of an action as training points.

Description follows regarding an example of a case in which the number of training points is predetermined. For example, say the estimation section 108, described later, estimates in sequence from the front of the string of shapes, and the shape classification of the target is a flat surface. In such cases, the number of training points is a determined to be a single point on the flat surface of the target in cases in which the previously estimated shape is a point or a curved surface. In similar cases, the number of training points is determined to be two on a flat surface of the target in cases in which the previously estimated shape is a flat surface. Moreover, for example, similarly to above, say estimation is performed in sequence from the front of the string of shapes, and the shape classification of the target is a rounded surface. In such cases the number of training points is determined to be two points on the rounded surface of the target. Note that in cases in which there are determined to be two training points, the possibility of a drop in shape estimation accuracy by the estimation section 108, described later, rises when the distance between the training points is too close, and so positions may be determined so as to be substantially as far away from each other on a flat surface or a rounded surface of the target.

The instruction section 104 instructs the identified number of training points to the user of by display on a display, which is an example of the output device 20. In response to this instruction, the user then manipulates the robot 30 using the training pendant 40 so as to move the roller 32 to the instructed training points. The I/O device 38 acquires the rotation angle of each of the joints of the robot 30 at the training points and outputs these to the path generation device 10.

The acquisition section 106 acquires positional information about the shaft of the roller 32 at the distal end of the robot 30 as trained by manipulation by the user in response to the instruction from the instruction section 104. More specifically, the acquisition section 106 acquires the rotation angle of each of the joints of the robot 30 at the training points as input from the I/O device 38. The acquisition section 106 uses kinematics information about the robot 30 and the rotation angle of each of the joints to acquire positional information (three dimensional coordinates) of the roller 32.

The estimation section 108 estimates a shape of the target object 50 based on the positional information acquired by the acquisition section 106. More specifically, the estimation section 108 estimates the shape of the estimation target in the string of shapes of the target object 50 based on geometric restraint conditions between a estimated shape of a shape one previous to this shape (hereafter referred to as "previous shape") and the acquired positional information.

Figure 5:
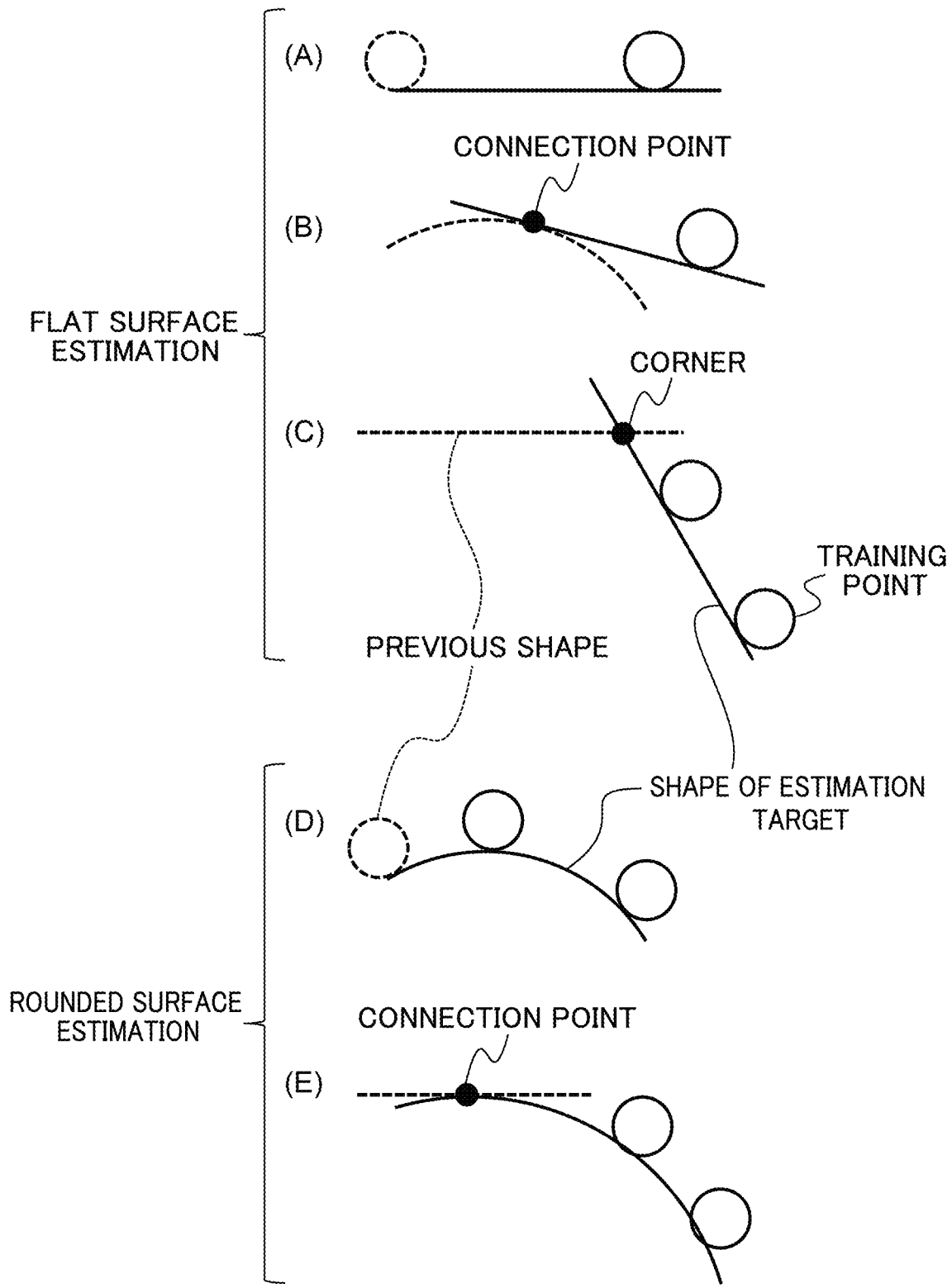
FIG. 5 is a diagram to explain shape estimation in the first exemplary embodiment.

A more specific description follows, with reference to FIG. 5. Note that in the present exemplary embodiment an axial direction of the roller is fixed with respect to a horizontal direction. Namely, when viewed from the side, estimation of a flat surface is equivalent to estimating a straight line, and estimation of a rounded surface is equivalent to estimating a circular arc. In FIG. 5 the shape of the estimation target is illustrated by a solid line, the previous shape is illustrated by a dashed line, and the position of the roller 32 at each of the training points is illustrated by a circle.

First description follows regarding a case in which the shape classification of the estimation target is a flat surface. As illustrated at (A) in FIG. 5, in cases in which the previous shape is the start point, the estimation section 108 estimates a flat surface (straight line in side view) connecting the two points lying in the same plane that are the start point and the training point for the flat surface of the estimation target. Moreover, as illustrated at (B) in FIG. 5, in cases in which the previous shape is a rounded surface, the estimation section 108 estimates a flat surface tangential to a training point for the flat surface of the estimation target and tangential to the rounded surface of the previous shape. Moreover, as illustrated at (C) in FIG. 5, in cases in which the previous shape is a flat surface, because the shape of the estimation target is unable to be estimated using the previous shape, two training points on the estimation target flat surface are instructed by the instruction section 104. The estimation section 108 thereby estimates a flat surface tangential to and in the same plane as the two training points for the flat surface of the estimation target.

Next, description follows regarding a case in which the shape classification of the estimation target is a rounded surface. As illustrated at (D) in FIG. 5, in cases in which the previous shape is the start point, the estimation section 108 estimates a rounded surface (a circular arc in side view) tangential to and in the same plane as the start point and two training points for the rounded surface of the estimation target. Moreover, as illustrated at (E) in FIG. 5, in cases in which the previous shape is a flat surface, the estimation section 108 estimates a rounded surface tangential to the flat surface of the previous shape, which is a rounded surface tangential to and in the same plane as the two training points for the rounded surface of the estimation target.

Figure 6:
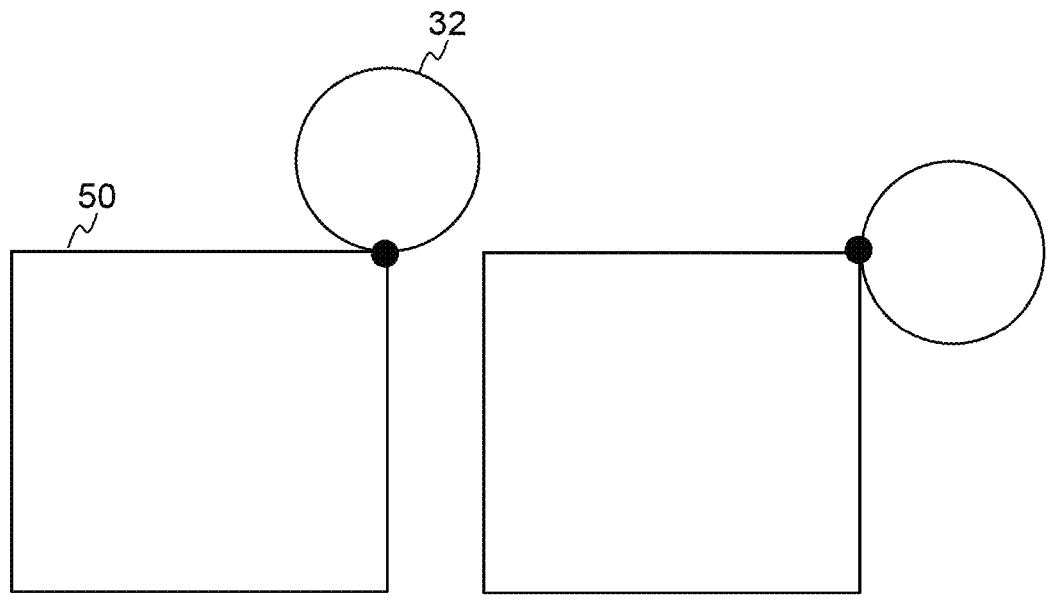
FIG. 6 is a diagram to explain difficulties in training at corners.

Moreover, in cases in which both the estimated previous shape and the shape of the estimation target are flat surfaces, the estimation section 108 estimates a line of intersection of the two flat surfaces (a point in side view) as a corner of the target object 50. Moreover, in cases in which one out of the previous shape and the shape of the estimation target is a flat surface and the other thereof is a curved surface, the estimation section 108 estimates a line touching the flat surface and the curved surface (a point in side view) as connection points between the flat surface and the curved surface of the target object 50. In cases in which acquisition of positional information of a corner is by training and not by estimation, as illustrated in FIG. 6, there is a need for the roller 32 to be aligned with the corner of the target object 50 (the black circle in FIG. 6) at extremely high accuracy. There is moreover a need to train from two directions with respect to the corner in order to generate a path to move the roller 32 along the corner. However, misalignment is liable to occur when training a corner, and there is a high degree of difficulty to such a training operation. Training the exact position is also difficult for connection points. In the present exemplary embodiment corners and connection points are not trained directly and are instead found by estimation, enabling the difficulty of training to be lowered.

Moreover, in cases in which the shape of the estimation target is a B-spline curve surface or an elliptical surface, the estimation section 108 estimates the shape from the positional information of the training points instructed according to these shapes and from a computational equation corresponding to these shapes.

Figure 7:
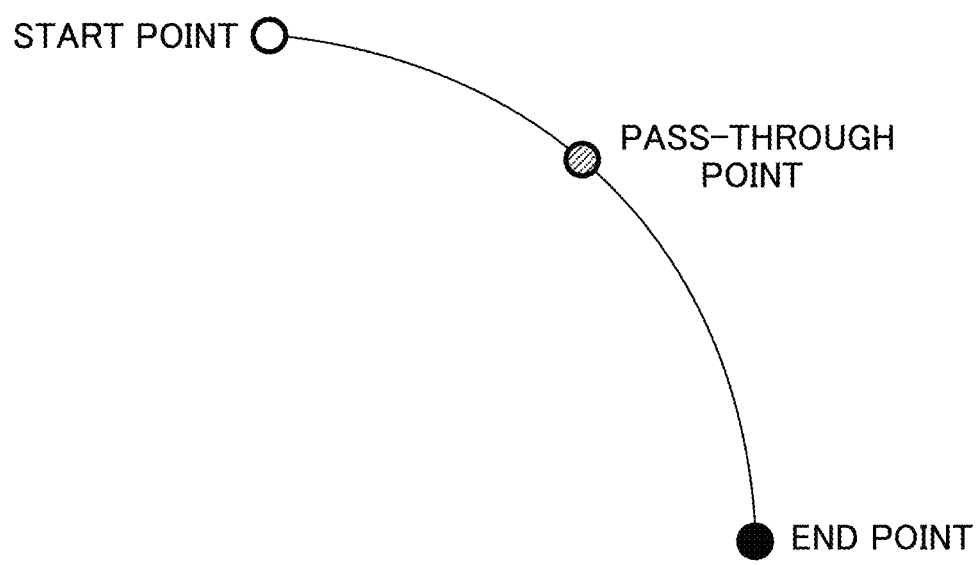
FIG. 7 is a diagram to explain shape information at a rounded surface.

The estimation section 108 passes shape information, which is information identifying the estimated shape, to the generation section 110. The shape information may, for example, be found from each position such as the start point, a shape (corner or connection point) between adjacent shapes, and the end point, as positional information for the start point and the end point of each of the shapes. In cases in which the shape information is for a rounded surface, as illustrated in FIG. 7, in addition to the positional information of the start point (white circle in FIG. 7) and the end point (black circle in FIG. 7), positional information may also be included for a pass-through point other than the start point and the end point (shaded circle in FIG. 7) on the estimated shape (circular arc). Moreover, coordinates of the center of a circular arc may be included therein instead of the positional information for a pass-through point.

Based on the shape of the target object 50 as estimated by the estimation section 108, the generation section 110 generates a path for the robot 30 to perform an action along the target object 50. More specifically, in cases in which a path is to be generated with reference to the position of the shaft of the roller 32, the generation section 110 calculates a trajectory of the roller 32 as viewed from the side when action of the robot 30 is at positions distanced from the estimated shape of the target object 50 by a distance of a radius of the roller 32. The generation section 110 then generates a path as a series of rotation angles for each of the joints of the robot 30 to move the roller 32 along this trajectory.

Figure 8:
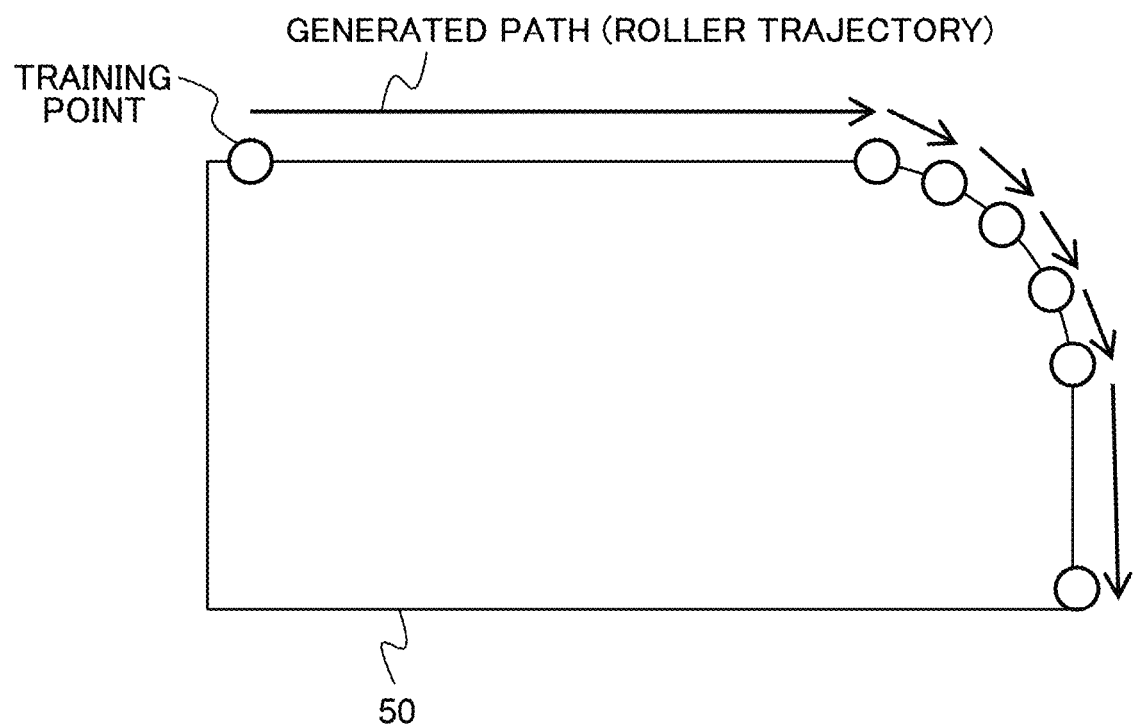
FIG. 8 is a diagram to explain a general method for generating a path from positional information of training points.
Figure 9:
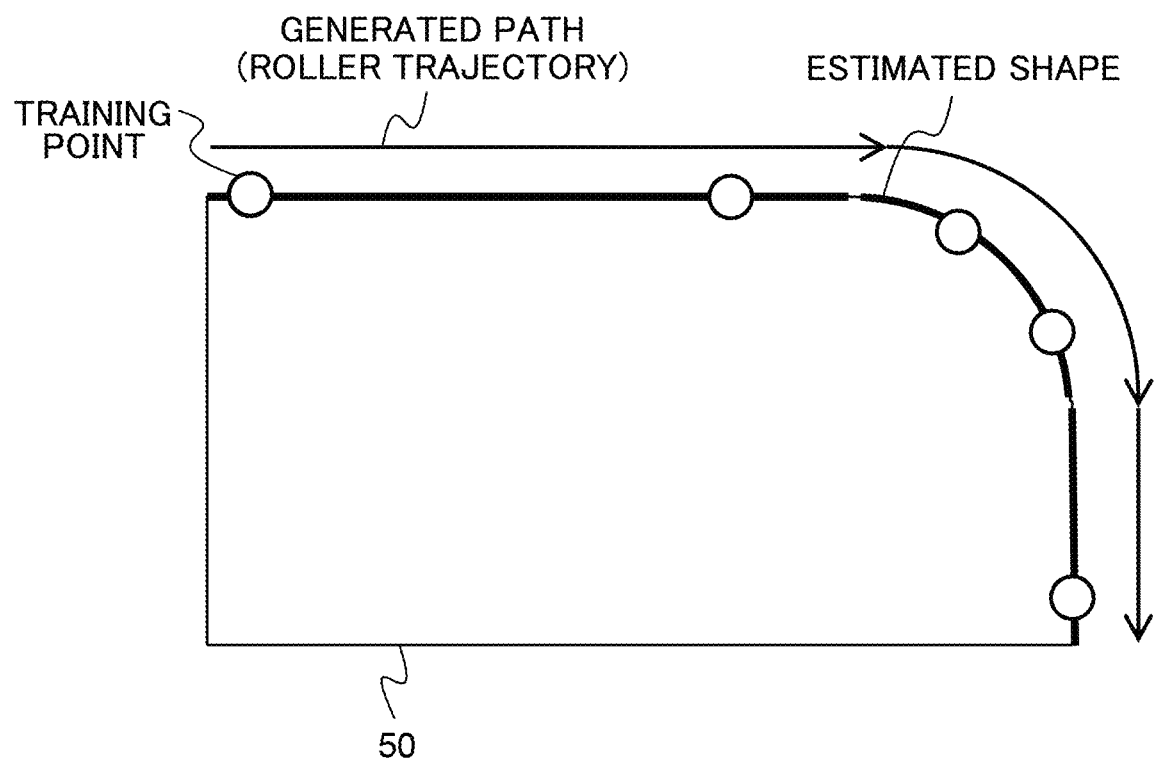
FIG. 9 is a diagram to explain a method for generating a path from positional information of training points in the present exemplary embodiment.

Generally, as illustrated in FIG. 8, a path is generated by straight-line interpolation between points indicted by the positional information of the training points. In such situations there is a low degree of matching between the actual shape of the target object 50 and the path particularly for a rounded surface portion, and so there is a high possibility of the roller 32 either biting in or floating when the robot 30 is actuated based on a path generated in this manner. In order to avoid such a situation there is a need to have many training points. However, in the present exemplary embodiment, as illustrated in FIG. 9, the generation section 110 generates a path along the estimated shape of the target object 50, thereby enabling a path to be generated with high accuracy even for rounded surface portions using few training points at given positions on the rounded surface.

Figure 10:
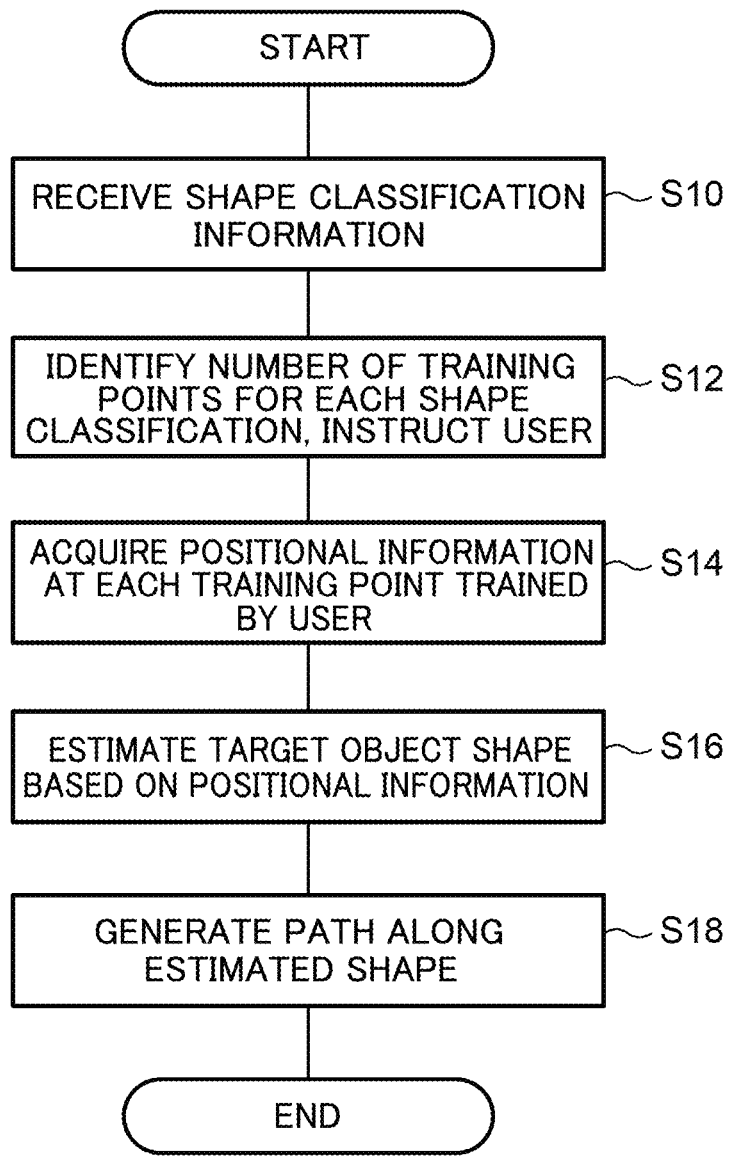
FIG. 10 is a flowchart illustrating a flow of path generation processing of the first and second exemplary embodiments.

Next, description follows regarding the operation and advantageous effects of the robot control system 100 according to the first exemplary embodiment. FIG. 10 is a flowchart illustrating a flow of path generation processing executed by the CPU 12 of the path generation device 10. The CPU 12 reads the path generation program from the storage device 16, and the CPU 12 functions as each functional configuration section of the path generation device 10 by expanding and executing the path generation program in the memory 14, so as to execute the path generation processing illustrated in FIG. 10.

At step S10, the reception section 102 receives the shape classification information such as "flat surface—rounded surface—flat surface" for a string of shapes of the target object 50. Next, at step S12, the instruction section 104 identifies the number of training points for each of the shape classifications in the string of shapes indicated by the shape classification information and, for example, instructs a user with an instruction such as "start point, one point on flat surface, two points on rounded surface, one point on flat surface". Next, at step S14, the acquisition section 106 acquires positional information of a specific location of the robot 30 trained by manipulation by the user according to the instruction by the instruction section 104.

Next, at step S16 the estimation section 108 estimates the shape of the target object 50 based on the positional information acquired by the acquisition section 106. In cases in which the training points are configured by the above "start point, one point on flat surface, two points on rounded surface, one point on flat surface", then the estimation section 108 estimates a first flat surface shape as a flat surface tangential to and in the same plane as the two points of the start point and the one training point for the first flat surface. Next, the estimation section 108 estimates a rounded surface tangential to the flat surface that is the previous shape, with this being a rounded surface tangential to and in the same plane as the two training points for the next rounded surface. Furthermore, the estimation section 108 also estimates a flat surface tangential to the training point for the next flat surface and the previous rounded surface.

Next, at step S18, the generation section 110 calculates a trajectory of the shaft of the roller 32 as viewed from the side when action of the robot 30 is at positions distanced from the estimated shape of the target object 50 by a distance of a radius of the roller 32. The generation section 110 then generates a path, this being a series of rotation angles for each of the joints of the robot 30 to move the roller 32 along this trajectory. The generation section 110 outputs the generated path to the robot control device 36 and ends the path generation processing.

In the robot control device 36 the action of the robot 30 is controlled based on the path generated by the path generation device 10.

As described above, in the robot control system according to the first exemplary embodiment, the path generation device receives shape classifications of a target object for cases in which the robot performs an action along a target object. The path generation device also instructs the number of training points identified for each of the shape classifications to the user as training points for training positions of a specific location of the robot to perform this action based on the received shape classifications. The path generation device acquires positional information of the specific location of the robot trained by manipulation of the user according to the instructions of the instruction section, and estimates the shape of the target object based on the acquired positional information. Furthermore, the path generation device generates a path for the robot to perform an action along the target object based on the estimated shape of the target object. This thereby enables both a reduction in training points for generating the path along the shape of the target object and an increase in training accuracy to be achieved.

For example, a startup procedure on site entails a great cost associated with the time taken for the startup procedure, as the factory or production line needs to be stopped for the startup procedure. The present exemplary embodiment has a large effect on reducing the cost of startup procedures due to being able to compress the time needed for training by the user. Each of the shapes is also estimated as a single surface, and so the data load and the like during execution is reduced in comparison to cases in which the path is generated by straight-line interpolation of positional information of training points, particularly for rounded surfaces, thereby raising the program response speed.

Note that although in the first exemplary embodiment description is of a case in which, in the path generation processing, the number of training points for a string of shapes is instructed at once, and the positional information for all the training points is acquired together, there is no limitation thereto. The instruction of the number of training points, and the acquisition of the positional information of the training points, may be performed one at a time in sequence for each of the shapes included in the string of shapes.

Second Exemplary Embodiment

Description next follows regarding a second exemplary embodiment. Note that configuration in the robot control system according to the second exemplary embodiment that is similar to that of the robot control system 100 of the first exemplary embodiment is appended with the same reference numerals and detailed explanation thereof will be omitted.

As illustrated in FIG. 1, a robot control system 200 according to the second exemplary embodiment is configured including a path generation device 210, a robot 30, a roller 32, a robot control device 36, an I/O device 38, and a training pendant 40.

As illustrated in FIG. 3, a path generation device 210 includes, as functional configuration, a reception section 102, an instruction section 2104, an acquisition section 2106, a estimation section 2108, and a generation section 110.

The instruction section 2104, similarly to the instruction section 104 of the first exemplary embodiment, identifies the number of training points for each of the shape classifications, and instructs these to the user. However, in the second exemplary embodiment, in order to estimate the shape of a target object 50 in the estimation section 2108 described later without utilizing the previous shape, the instruction section 2104 identifies and instructs the number of training points capable of independently estimating the shape of the estimation target. For example, the instruction section 2104 instructs two points on a flat surface as training points in cases in which the shape of the estimation target is a flat surface, and instructs three points or the like on a rounded surface as training points in cases in which the shape of the estimation target is a rounded surface.

The acquisition section 2106, similarly to the acquisition section 106 of the first exemplary embodiment, acquires the positional information of the training points according to the instruction of the instruction section 2104. In addition, the acquisition section 2106 also acquires positional information of training points freely added by a user.

Figure 11:
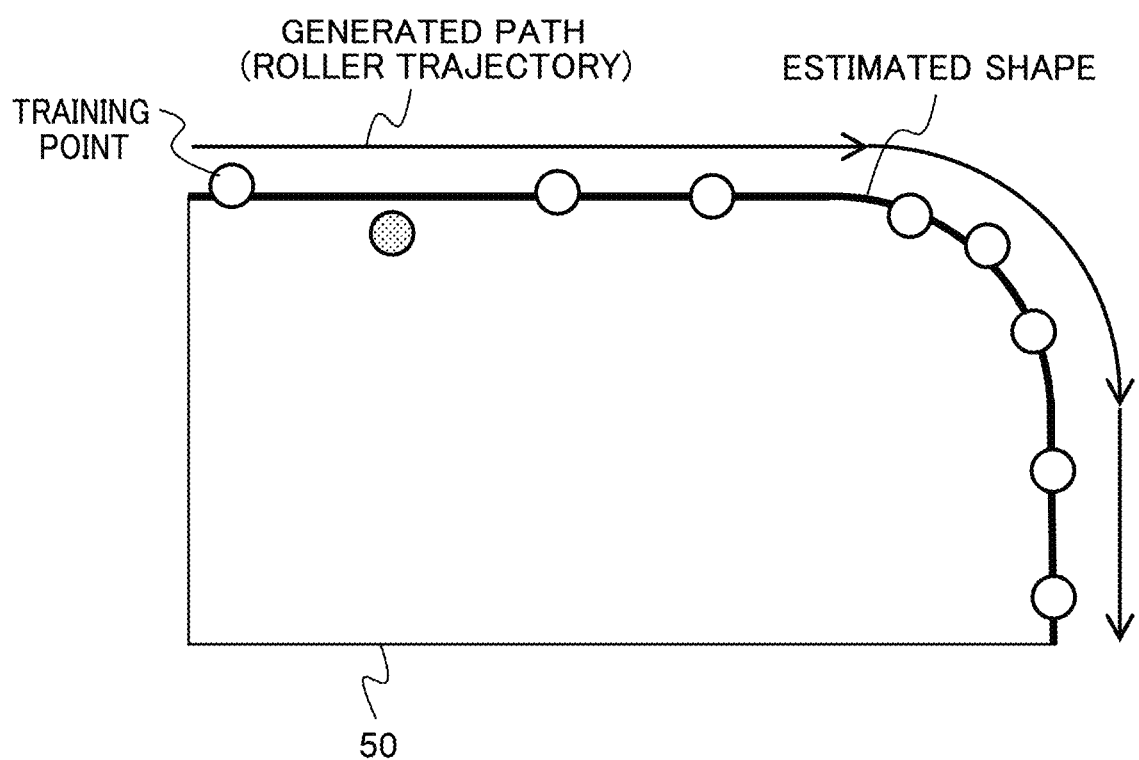
FIG. 11 is a diagram to explain shape estimation in the second exemplary embodiment.

The estimation section 2108, instead of performing sequential estimation of a string of shapes, estimates the entire shape of the target object 50 based on the positional information of all the acquired training points. For example, as illustrated in FIG. 11, the estimation section 2108 estimates a shape so as to minimize an error (a least square error, for example) in the positional information of the respective training points.

Moreover, in cases in which there is a training point present (for example, the shaded circle in FIG. 11) having a large error to the estimated shape, the estimation section 2108 may present a warning to a user that there is a training point having a large error present. Moreover, the estimation section 2108 may remove the training point having a large error and then re-estimate the shape of the target object 50.

Next, description follows regarding the operation and advantageous effects of the robot control system 200 according to the second exemplary embodiment. In the second exemplary embodiment too, the path generation device 210 executes the path generation processing illustrated in FIG. 10. However, this processing differs from the path generation processing of the first exemplary embodiment in the following manner.

First, at step S12 the instruction section 2104 identifies and instructs the number of training points for estimating the shape of the target object 50 without utilizing the previous shape as the number of training points for each of the shape classifications.

Moreover at step S14, in addition to the positional information of training points corresponding to the instruction of the instruction section 2104, the acquisition section 2106 also acquires positional information of training points freely added by a user.

Moreover, instead of performing sequential estimation of a string of shapes, at step S16 the estimation section 2108 estimates the entire shape of the target object 50 based on the positional information of all the acquired training points. Together with this, in cases in which there are training points having a large error to the estimated shape present, the estimation section 2108 may present the user with a warning that there are training points having a large error present, or the training points having a large error may be removed and then the shape of the target object 50 re-estimated.

As described above, in the robot control system according to the second exemplary embodiment, the path generation device includes the training points freely added by a user, and estimates the entire shape of the target object based on the positional information of all the training points. This thereby enables the shape of the target object to be estimated with good accuracy.

Third Exemplary Embodiment

Next, description follows regarding a third exemplary embodiment. Note that configuration in the robot control system according to the third exemplary embodiment that is similar to that of the robot control system 100 of the first exemplary embodiment is appended with the same reference numerals and detailed explanation thereof will be omitted.

Figure 12:
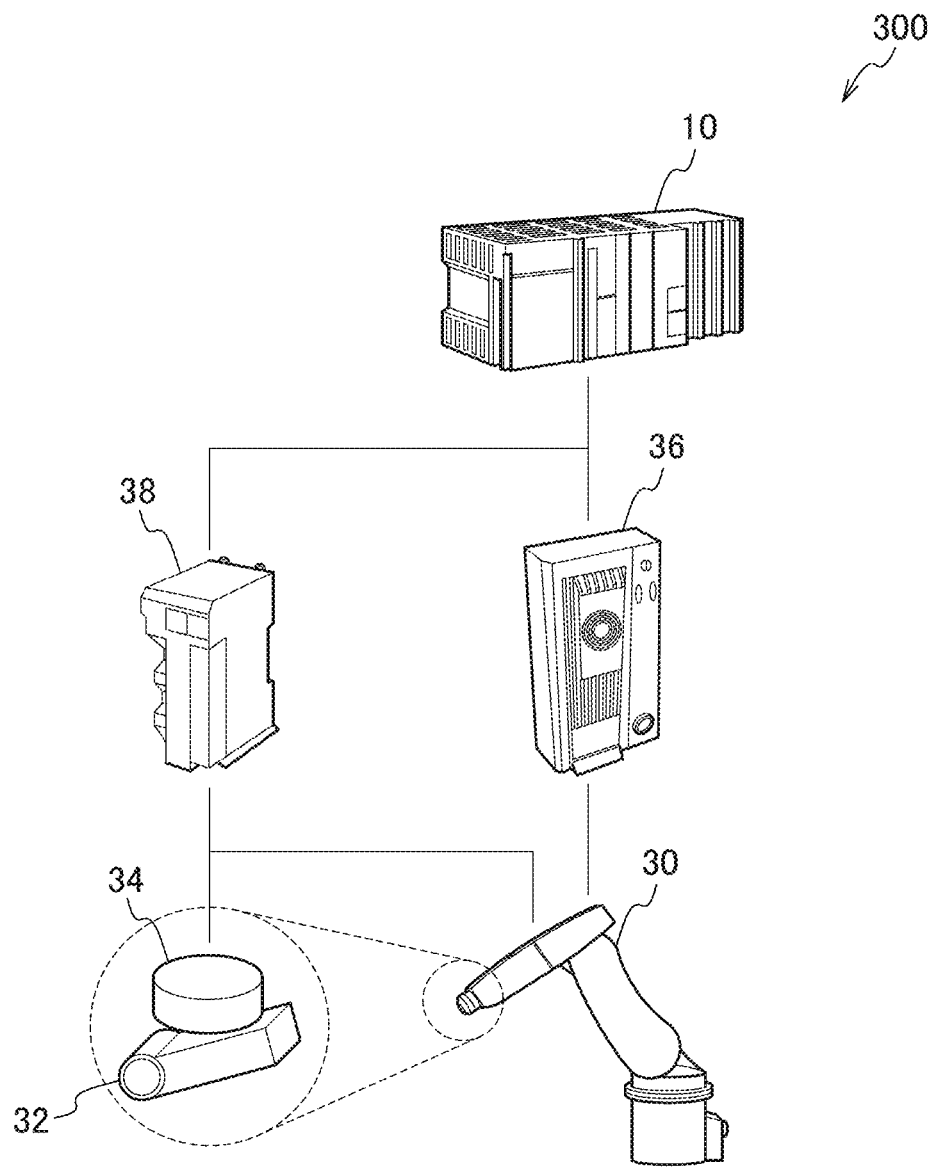
FIG. 12 is a schematic diagram illustrating a configuration of a robot control system according to a third exemplary embodiment.

As illustrated in FIG. 12, a robot control system 300 according to the third exemplary embodiment is configured including a path generation device 310, a robot 30, a roller 32, a haptic sensor 34, a robot control device 36, and an I/O device 338.

The haptic sensor 34 is a sensor that detects external force acting on the robot 30 through the roller 32, such as when the roller 32 is pressed against something in the peripheral environment.

The I/O device 338 acquires rotation angles for each of the joints from the robot 30 and outputs these to the path generation device 310. The I/O device 338 also acquires sensor values indicting the external force as detected by the haptic sensor 34 and outputs these to the path generation device 310.

Figure 13:
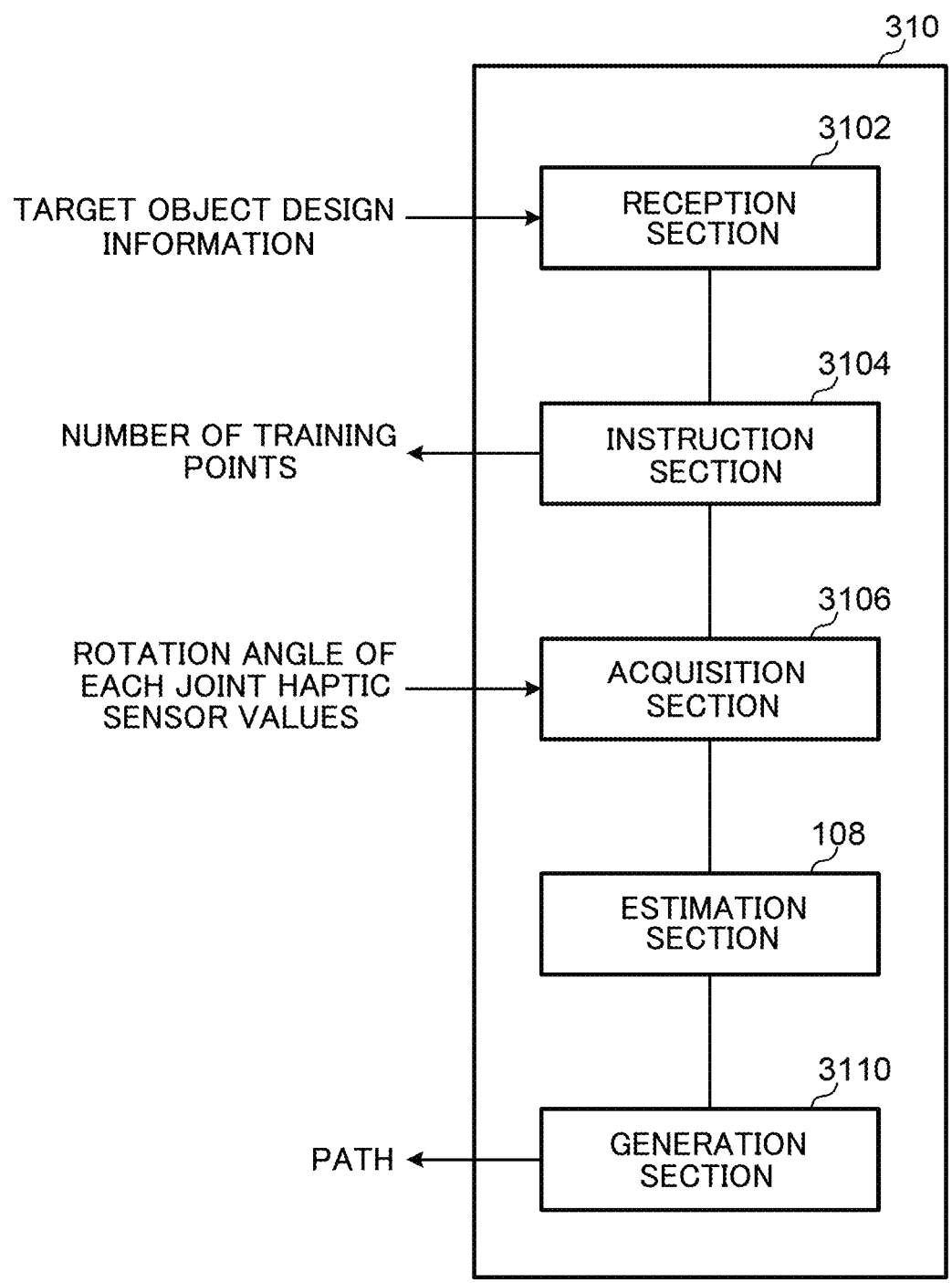
FIG. 13 is a block diagram illustrating an example of a functional configuration of a path generation device according to the third exemplary embodiment.

As illustrated in FIG. 13, the path generation device 310 includes, as functional configuration, a reception section 3102, an instruction section 3104, an acquisition section 3106, a estimation section 108, and a generation section 3110.

In cases in which the robot 30 performs an action along the target object 50, the reception section 3102 receives design information indicating design positions and shapes of the target object 50. For example, the reception section 3102 receives as design information CAD data, layout data, or the like of the target object 50.

The instruction section 3104 identifies the number and position of training points based on the design positions and shapes of the target object 50 as received from the reception section 3102. More specifically, the instruction section 3104 identifies classifications for a string of shapes from the design shapes of the target object 50, and then similarly to in the first exemplary embodiment identifies the number and position of training points for each of the shape classifications. Note that in the third exemplary embodiment the robot 30 is controlled and the training is performed automatically without manipulation by a user, and not only is the number of training points instructed, but identified coordinate positions are also instructed as training point positions. The instruction section 3104 outputs, to the robot control device 36, the number and position of identified training points, together with an instruction so as to execute training by the roller 32 being pressed against the target object 50 at the training points.

Figure 14:
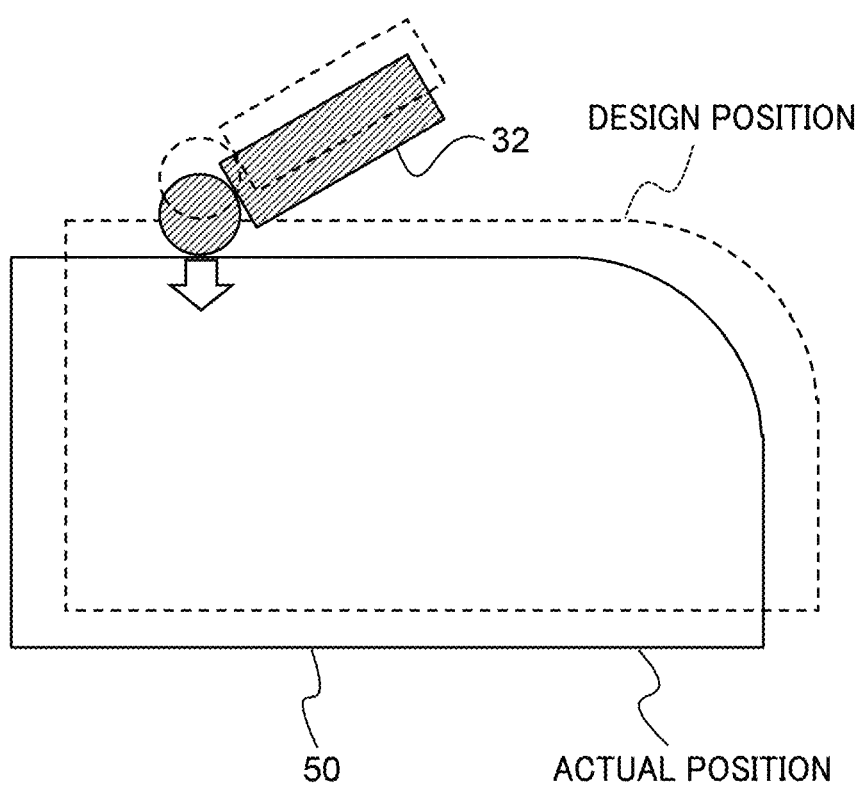
FIG. 14 is a diagram to explain discrepancies between an actual position of a target object and a design position of the target object.

Explanation follows regarding the reason for performing a pressing action during training. As illustrated in FIG. 14, sometimes misalignment arises between an actual position of a target object 50 (as indicted by the solid line in FIG. 14) and a design position of the target object 50 (as indicted by the broken line in FIG. 14). In such cases exact positional information is not acquirable even by executing training at the positions of the training points as identified based on the design shapes and positions of the target object. To address this issue, exact positional information is acquired by executing actual training at positions where a pressing action is performed on the target object 50 based on the instructed training points. Note that this pressing action is an action to press the roller 32 toward the target object 50 side until an external force as detected by the haptic sensor 34 reaches a value in a specific range. The value in the specific range may be a predetermined external force appropriate for when sticking a sheet to the target object 50 using the roller 32.

The acquisition section 3106 acquires the positional information of the shaft of the roller 32 at the distal end of the robot 30 as trained according to the instruction from the instruction section 3104, and also acquires as a pressing force the external force acting on the robot 30 thereat.

The generation section 3110 generates the path for the robot 30 to perform an action along the target object 50 based on the shape of the target object 50 as estimated by the estimation section 108, and on the pressing force acquired by the acquisition section 3106. More specifically, similar to the generation section 110 of the first exemplary embodiment, the generation section 3110 generates a path based on the estimated shape, and generates the path such that a pressing force acts during execution at each of the points on the path that is the same as the pressing force acquired during training thereat. This thereby enables the same amount of deformation of the roller 32 to be achieved during training and during execution even in cases in which a material of the roller 32 is soft or the like and the roller 32 deforms, enabling an appropriate sticking action to be implemented.

Next, description follows regarding the operation and advantageous effects of the robot control system 300 according to the third exemplary embodiment. FIG. 15 is a flowchart illustrating a flow of path generation processing executed by the CPU 12 of the path generation device 310. The CPU 12 reads the path generation program from the storage device 16, and the CPU 12 functions as each functional configuration section of the path generation device 310 by expanding and executing the path generation program in the memory 14, so as to execute the path generation processing illustrated in FIG. 15.

At step S310, the reception section 3102 receives design information indicating the design positions and shapes of the target object 50 for a case in which the robot 30 performs an action along the target object 50. Next, at step S312, the instruction section 3104 identifies the classifications of a string of shapes from the design shapes of the target object 50, and identifies the number and position of training points for each of the shape classifications. The instruction section 3104 then outputs, to the robot control device 36, the number and position of the identified training points, and an instruction to execute training by pressing action at the training points.

Next, at step S314 the acquisition section 3106 acquires positional information of the shaft of the roller 32 at the distal end of the robot 30 trained according to the instruction from the instruction section 3104, and also acquires the external force acting on the robot 30 thereat as a pressing force. Next, at step S316 the estimation section 108 estimates the shape of the target object 50 based on the positional information acquired by the acquisition section 3106.

Next, at step S318 the generation section 3110 generates a path for the robot 30 to perform an action along the target object 50 based on the shape of the target object 50 as estimated by the estimation section 108, and on the pressing force acquired by the acquisition section 3106. The generation section 3110 outputs the generated path to the robot control device 36 and then ends the path generation processing.

As described above, in the robot control system according to the third exemplary embodiment the path generation device instructs the robot so as to execute training by performing the pressing action at the identified training points according to the shape classifications of the target object. This thereby enables training to be executed automatically to achieve both a reduction in the number of training points for generating the path along the shape of the target object, and a rise in training accuracy. The pressing force is also acquired at the training points, and the path is generated so as to recreate the pressing force during training when performing execution, thereby accommodating errors due to deformation of the roller or the like, and enabling an appropriate sticking action to be executed.

Note that the shape of the target object in the third exemplary embodiment may be estimated under geometric restraint conditions of a previous shape as in the first exemplary embodiment, or the entire shape may be estimated so as to minimize overall error to the training points as in the second exemplary embodiment.

Moreover, in the third exemplary embodiment the design information of the target object may be acquired together with a list of training points indicating a number and position of training points created by a user. In such cases the instruction section may check for excessive or insufficient training points created by a user with respect to the identified training points from the design information of the target object, so as to execute training of the robot after the list has been corrected.

Moreover, although in the exemplary embodiments described above a description was given regarding an example of a case of generating a path for an action to stick a sheet-shaped object to a target object as action of a robot along a target object, there is no limitation thereto. For example, the technology disclosed herein is applicable to generating a path for an action such as coating a coating material or the like onto a target object.

Moreover, although in the exemplary embodiments described above a description was given regarding an example of a case in which the path generation device and the robot control device are separate devices, an embodiment may be adopted in which the path generation device is incorporated into the robot control device. Moreover, each section of the functional configuration of the path generation device may be implemented by a different device, and the above path generation processing thereby implemented by distributed processing.

Moreover, the path generation processing executed by the CPU reading in software (a program) in the above exemplary embodiments may be executed by various processors other than a CPU. Examples of such processors include programmable logic devices (PLD) that allow circuit configuration to be modified post-manufacture, such as a field-programmable gate array (FPGA), and dedicated electric circuits and the like, these being processors including a circuit configuration custom-designed to execute specific processing, such as an application specific integrated circuit (ASIC). The path generation processing may be executed by any one of these various types of processors, or may be executed by a combination of two or more of the same type or different type of processor (such as plural FPGAs, or a combination of a CPU and an FPGA). The hardware structure of these various types of processors is more specifically an electric circuit combining circuit elements such as semiconductor elements.

Moreover, although in the above exemplary embodiments an embodiment was described in which the path generation program was pre-stored (installed) on the storage device, there is no limitation thereto. The program may be provided in a format stored on a storage medium such as a CD-ROM, DVD-ROM, Blu-ray disc, USB memory, or the like. Moreover, the program may be provided in a format downloadable from an external device over a network.

The invention claimed is:

1. A path generation device comprising:
   a memory; and
   a processor coupled to the memory, the processor being configured to execute processing, the processing comprising:
      receiving a classification of a shape of a target object for a case in which a robot is to perform an action along the target object;
      based on the received classification of the shape, instructing a user with a number of training points identified for each classification of the shape as training points for training positions of a specific location of the robot to perform the action, the number being a minimum number of the training points capable of uniquely determining the shape;
      acquiring positional information of the specific location of the robot as trained by manipulation by the user according to the instruction;
      estimating a shape of the target object based on the acquired positional information; and
      based on the shape of the target object as estimated, generating a path for the robot to perform the action along the target object.

2. The path generation device of claim 1, the processing further comprising:
   receiving classifications of a string of shapes of the target object in a sequence in which the shapes are opposed by the specific location of the robot in the action; and
   estimating a first shape as an estimation target in the string of shapes based on a second shape estimated one previous to the first shape and on the acquired positional information.

3. The path generation device of claim 2, further comprising instructing the user with a next shape in the string of shapes.

4. The path generation device of claim 2, the processing further comprising:
   in a case in which the estimated first shape and the estimated second shape are both flat surfaces, estimating a line of intersection between the first shape and the second shape as a corner of the target object, and in a case in which one of the first shape or the second shape is a flat surface and the other of the first shape or the second shape is a curved surface, estimating a tangent line tangential to the first shape and the second shape as connection points of the target object.

5. The path generation device of claim 1, the processing further comprising:

acquiring positional information of a training point added by the user in addition to the instruction by the instruction section; and estimating the shape based on the positional information of the training points corresponding to the instruction and the positional information of the training point added by the user.

6. The path generation device of claim 5, wherein the estimated shape minimizes an error in the positional information respectively acquired.

7. The path generation device of claim 5, wherein, in a case in which there is positional information present having a large error with respect to the estimated shape, the processing further comprises at least one of the following:

processing to warn of the positional information having a large error; or processing to remove the positional information having a large error and re-estimate the shape.

8. A path generation device comprising:

a memory; and a processor coupled to the memory, the processor being configured to execute processing, the processing comprising:

receiving a design position and a design shape of a target object for a case in which a robot is to perform an action along the target object;

based on the received design position and the received design shape of the target object, identifying a number and position of training points as identified for each classification of shape of the target object as training points for training positions of a specific location of the robot to perform the action, the number being a minimum number of the training points capable of uniquely determining the shape, and instructing the robot such that the robot presses against the target object and training is executed at the identified training points;

acquiring positional information of the specific location of the robot as trained according to the instruction and acquiring an external force acting on the robot;

estimating a shape of the target object based on the acquired positional information; and based on the estimated shape of the target object and on the acquired external force, generating a path for the robot to perform the action along the target object.

9. The path generation device of claim 8, the processing further comprising:

receiving classifications of a string of shapes of the target object in a sequence in which the shapes are opposed by the specific location of the robot in the action; and estimating a first shape as an estimation target in the string of shapes based on a second shape estimated one previous to the first shape and on the acquired positional information.

10. The path generation device of claim 9, the processing further comprising:

in a case in which the estimated first shape and the estimated second shape are both flat surfaces, estimating a line of intersection between the first shape and the second shape as a corner of the target object, and in a case in which one of the first shape or the second shape is a flat surface and the other of the first shape or the second shape is a curved surface, estimating a tangent line tangential to the first shape and the second shape as connection points of the target object.

11. The path generation device of claim 8, the processing further comprising:

acquiring positional information of a training point added by a user in addition to the instruction; and estimating the shape based on the positional information of the training points corresponding to the instruction and the positional information of the training point added by the user.

12. The path generation device of claim 11, wherein the estimated shape minimizes an error in the positional information respectively acquired.

13. The path generation device of claim 11, wherein, in a case in which there is positional information present having a large error with respect to the estimated shape, the processing further comprises at least one of the following:

processing to warn the positional information having a large error; or processing to remove the positional information having a large error and re-estimate the shape.

14. A path generation method comprising:

receiving a classification of a shape of a target object for a case in which a robot is to perform an action along the target object;

instructing a user, based on the received classification of the shape, with a number of training points identified for each classification of the shape as training points for training positions of a specific location of the robot to perform the action, the number being a minimum number of the training points capable of uniquely determining the shape;

acquiring positional information of the specific location of the robot as trained by manipulation by the user according to the instruction;

estimating a shape of the target object based on the acquired positional information; and generating a path for the robot to perform the action along the target object based on the estimated shape of the target object.

15. The path generation method of claim 14, further comprising:

receiving classifications of a string of shapes of the target object in a sequence in which the shapes are opposed by the specific location of the robot in the action; and estimating a first shape as an estimation target in the string of shapes based on a second shape estimated one previous to the first shape and on the acquired positional information.

16. The path generation method of claim 15, further comprising:

in a case in which the estimated first shape and the estimated second shape are both flat surfaces, estimating a line of intersection between the first shape and the second shape as a corner of the target object, and p1 in a case in which one of the first shape or the second shape is a flat surface and the other of the first shape or the second shape is a curved surface, estimating a tangent line tangential to the first shape and the second shape as connection points of the target object.

17. The path generation method of claim 14, further comprising:

acquiring positional information of a training point added by the user in addition to the instruction; and estimating the shape based on the positional information of the training points corresponding to the instruction and the positional information of the training point added by the user.

18. A path generation method comprising:

receiving a design position and a design shape of a target object for a case in which a robot is to perform an action along the target object;

dentifying, based on the received design position and the received design shape of the target object, a number and position of training points as identified for each classification of shape of the target object as training points for training positions of a specific location of the robot to perform the action, the number being a minimum number of the training points capable of uniquely determining the shape, and instructing the robot such that the robot presses against the target object and training is executed at the identified training points;

acquiring positional information of the specific location of the robot as trained according to the instruction and acquiring an external force acting on the robot;

estimating a shape of the target object based on the acquired positional information; and generating a path for the robot to perform the action along the target object based on the estimated shape of the target object and on the acquired external force.

19. A non-transitory storage medium storing a path generation program that, when executed by a computer having a memory and a processor, causes the computer to:

receive a classification of a shape of a target object for a case in which a robot is to perform an action along the target object;

based on the received classification of the shape, instruct a user with a number of training points identified for each classification of the shape as training points for training positions of a specific location of the robot to perform the action, the number being a minimum number of the training points capable of uniquely determining the shape;

acquire positional information of the specific location of the robot as trained by manipulation by the user according to the instruction;

estimate a shape of the target object based on the acquired positional information; and based on the estimated shape of the target object, generate a path for the robot to perform the action along the target object.

20. A non-transitory storage medium storing a path generation program that, when executed by causes a computer having a memory and a processor, causes the computer to:

receive a design position and a design shape of a target object for a case in which a robot is to perform an action along the target object;

based on the received design position and the received design shape of the target object, identify a number and position of training points as identified for each classification of shape of the target object as training points for training positions of a specific location of the robot to perform the action, the number being a minimum number of the training points capable of uniquely determining the shape, and instruct the robot such that the robot presses against the target object and training is executed at the identified training points;

acquire positional information of the specific location of the robot as trained according to the instruction and acquire an external force acting on the robot;

estimate a shape of the target object based on the acquired positional information; and based on the estimated shape of the target and on the acquired external force, generate a path for the robot to perform the action along the target object.

* * * * *